(12) United States Patent
Baker et al.

(10) Patent No.: US 6,644,226 B2
(45) Date of Patent: Nov. 11, 2003

(54) SEED SOWING APPARATUS

(76) Inventors: Christopher John Baker, 30 Nannestad Line, RD 5, Feilding 5600 (NZ); Craig David Kernohan, Reid Line, RD 11, Palmerston North 5321 (NZ); David John Robinson, Taipo Road, RD 6, Palmerston North 5454 (NZ); William Rowlan Ritchie, 211 Milsom Line, Palmerston North 5301 (NZ)

( * ) Notice: Subject to any disclaimer, the term of this patent is extended or adjusted under 35 U.S.C. 154(b) by 0 days.

(21) Appl. No.: 09/889,477
(22) PCT Filed: Jan. 12, 2001
(86) PCT No.: PCT/NZ00/00002
§ 371 (c)(1), (2), (4) Date: Dec. 5, 2001
(87) PCT Pub. No.: WO00/41553
PCT Pub. Date: Jul. 20, 2000

(65) Prior Publication Data
US 2002/0134288 A1 Sep. 26, 2002

(30) Foreign Application Priority Data
Jan. 16, 1999 (NZ) ................................. 330999

(51) Int. Cl.$^7$ ............................ A01C 5/06; A01C 5/08; A01C 7/06; A01C 7/20; A01C 15/16
(52) U.S. Cl. ..................................................... 111/192
(58) Field of Search ................................ 111/192, 193, 111/190, 200, 170, 177, 140, 14, 121, 120

(56) References Cited

U.S. PATENT DOCUMENTS 2,917,012 A  * 12/1959 Oehler et al.
3,213,812 A  * 10/1965 Forsyth et al.

FOREIGN PATENT DOCUMENTS

| DE | 3418176 A | * 11/1985 |
| EP | 0501836 A | * 9/1992 |
| FR | 2727601 A | * 6/1996 |
| GB | 2001513 A | * 2/1979 |

* cited by examiner

Primary Examiner—Christopher J. Novosad
(74) Attorney, Agent, or Firm—Abelman, Frayne & Schwab

(57) ABSTRACT

The present invention relates to a seed sowing apparatus which includes a substantially flat circular disc (1) mounted on a frame so as to be rotatable about horizontal axis (2) while partly embedded in soil (3) and drawn in a forward direction substantially parallel to the soil surface and substantially perpendicular to a disc axle. The apparatus also includes at least one blade (10) having a leading edge (11) defined by the intersection of two opposite side surfaces and structure (41, 45) for mounting the blades on the apparatus so that the leading edge (11) is held close to or in intimate contact with the disc (1), wherein the at least one blade's leading edge (11) is inclined in a plane of the blade such that an angle of the leading edge (11) with respect to an arc (A, B, C) of the disc surface passing beneath the leading edge (11) is zero or positive over the entire length of the leading edge (11).

23 Claims, 6 Drawing Sheets

SEED SOWING APPARATUS

TECHNICAL FIELD

This invention relates to improvements to the blades of a seed sowing apparatus, which has also previously been referred to as a ground channelling apparatus.

BACKGROUND ART

Apparatus for sowing seeds into untilled soils (usually covered by plant residues) wherein the seed is deposited into a slit formed in the ground by a disc have been generally described in the following patents.

"Improvements in and relating to seed sowing implements"—New Zealand No. 184742, U.S. Pat. No. 4,275,671, Canada No. 1092899, United Kingdom No. 2001513, France No. 79/01024, and Australia No. 517689, "Seed sowing apparatus"—New Zealand No.237288, U.S. Pat. No. 5,269,237, Canada No. 2062/60-5, EU (France, United Kingdom, Spain, Germany) No. 92301760.2, Australia No. 662121, Norway No. 92.0820, Japan No. 4-80523, South Africa No. 92/1553.

Amongst the novel features of the designs described in the above patents, are one or more winged side blades which are arranged so that they each contact the lateral faces on either side of a flat circular disc which rotates about a horizontal axis while partly embedded in the soil, and which is drawn in a forward direction with its axle substantially parallel to the soil surface and is sited perpendicular to the disc axle and direction of travel.

Each side blade contacts the disc face almost throughout the entire length of the leading edge of the blade, which is straight in the vertical-longitudinal plane and has an inclined outer surface to deflect material away from the disc. As the combination advances through the soil the blade is held against the disc by a combination of self-adjusting lateral soil forces and a fixed pre-load exerted on the blade(s) by a spring device located near the top of each blade. This intimate contact is essential to the function of the device in not only passing through soil but also in passing without blockage through plant residues lying on the soil surface. Such plant residues are an essential ingredient of the practice of seeding into untilled soils as they protect the soil from erosion and moisture loss. This practice is variously known as "no-tillage", "no-till", "zero tillage", "conservation tillage" or "direct drilling".

Towards the rear of each blade, the blade is formed so that the inner surface is sufficiently clear of the disc to allow the passage of granular or particulate objects such as seeds, fertiliser and/or dry pesticides to pass in a controlled manner down the gap between the inner surface of the blade and the flat surface of the disc, to come to rest in the soil. The blade is also angled forward at its top so as to ensure that these particulate materials remain within the blade confines while falling into the soil under gravitational force and/or with the assistance of a controlled air steam blowing down the delivery tubes from a fan.

The above design allows almost identical right and left handed blades to be positioned on opposite sides of a disc and two separate bands of material, such as seed and dry fertiliser can be deposited in the soil simultaneously without the two bands coming into contact with one another. This is an important feature since contact between these two materials in the soil often results in the fertiliser having a toxic effect on the seed.

These types of devices in their present form have several problems:

In all forms in which the blade has so far been described in its relationship to the disc, the leading edge is either straight or slightly curved in the vertical-longitudinal plane. In all versions where this leading edge is straight or not specifically shaped, the angle of the leading edge with respect to an arc described by a portion of the disc surface as it passes beneath the leading edge varies along the leading edge from a positive angle where the arc is inclined outwards with respect to the leading edge, to a zero angle where the arc coincides with, or is parallel to the leading edge, to a negative angle where the arc is inclined inwards with respect to the leading edge.

Generally the blade is arranged so that the arc makes a positive angle with respect to the leading edge, at least over a length of the blade (referred to herein as zone 1) which is designed to operate beneath the ground. This ensures that the soil, roots and plant residues beneath the soil together with plant residues above the soil or close to the soil surface, are deflected by the inclined surface of the leading edge of the blade away from the disc, and also due to the positive angle are deflected harmlessly towards the outer periphery of the disc surface as the disc surface slides beneath the leading edge.

This positive-to-zero angle may continue over a certain length of the blade leading edge that operates above the ground (referred to herein as zone 3), thereby similarly deflecting material towards the outer periphery of the disc. However, inevitably, due to design requirements, at an upper portion of the leading edge (referred to herein as zone 2), the angle with respect to the arc becomes negative, and the leading edge no longer functions to deflect material to the outer periphery of the disc. Although this may not be a problem with dry soils where minimal soil, roots or plant residue material adheres to the disc, this can be a problem in wet and/or sticky soils.

The problem in wet or sticky soils is that a thin film of soil and plant material often adheres to the disc surface and is wiped off by the inside surface of the blade in the negative angle zone 2 region. This causes a build-up of unwanted soil to occur between the inner blade surface behind the leading edge, and the disc. As this build-up is cumulative, it eventually forces the blade to lose contact with the disc, which largely destroys the ability of the blade (and thus the whole device) to clear plant residues. Since the ability to clear such residues is an essential ingredient in its intended function, this problem interferes with the function of the device in the field.

In an attempt to overcome this disadvantage, most previous designs of blades have featured a window designed so as to encourage soil and debris which would otherwise accumulate inside the blade in the negative angle zone 2 region, to instead be ejected to the outside of the blade through the window and fall harmlessly away. This window has proven to be only partially successful in practice, since it is limited in size by the physical dimensions of the blade, and often the window itself becomes blocked with soil, thus negating its function altogether.

A further problem arises because each blade is pivotally mounted at its top about a substantially horizontal-longitudinal axis to allow the blade to deflect a limited amount laterally so that it can maintain faithful contact with the disc as the latter flexes naturally in response to the heterogeneity of the soil and the changing direction of travel. While in zones 1 and 3 the blade can be designed to maintain unrestricted contact with the disc, towards the top of zone 2, where the pivotal mounting of the blade allows less lateral movement, a small clearance is designed between the blade and the disc to avoid the possibility of mechanical jamming between the disc and the blade.

Occasional pieces of straw or other materials find their way into this small gap from which they are forced progressively downwards, separating the blade from the disc, firstly in zone 2, then in zone 3, and eventually in zone 1. When this occurs the scraping function in the positive angle zone 3 and zone 1 regions is compromised, allowing straw and/or other material and residue on the blade to ingress so that eventually the residue-clearance ability of the device fails, and an undesirable field blockage occurs which seriously disrupts the seeding function unless cleared. At best, clearance of the blockage represents a field stoppage, costing downtime and the loss of operating efficiency.

In other attempts to overcome the disadvantages discussed above, there have been attempts to design a substantially straight side blade, but with a length chosen so that the zone 2 portion of this blade is substantially eliminated. This side blade is attached to the disc by a supporting bracket that is usually positioned in the region of the disc where zone 2 would otherwise be. However, as such a side blade is of necessity reasonably short, it has been found to be only effective when used in combination with a disc that does not travel straight ahead.

For example, in these apparatus, it is usual for the disc to be angled to the direction of travel. This produces a "scuffing" action that in turn creates a "shaded zone" which prevents residue from entering zone 2 on the shaded side of the disc. Were it not for the angling of the disc, residue would collect in the region of the supporting bracket, which leads to problems with the operation of the side blade (such as those described above). In these embodiments, only one side blade can be used.

An additional problem with existing seed sowing devices arises because of the need to form an intimate contact between a new blade and the disc surface.

The scraping function of the side blades on the disc is very dependent on intimate contact being quickly established between the flat surface of the disc and the inside leading edge of each new blade. Once this intimate contact is established for a new blade, further wear of the blade maintains the integrity of contact and shape in a self-adjusting manner, providing a complementary fit between the two elements. Where such intimate contact is not quickly established for a new blade, a thin film of soil may flow between portions of the blade's leading edge and the disc, which erodes the inner face of the blade's leading edge, causing it to become rounded inwards. This interferes with the function of the whole device by separating a blade from the disc.

Some types of seed sowing devices include one or more winged side blades arranged so as to rub on either side of the central disc. Each side blade has a substantially horizontal lateral wing at its lower end, which faces away from the disc and creates a continuous, substantially horizontal shelf in the soil. When two side blades are used with one on either side of the disc, two such soil shelves are created beneath the soil surface, one on either side of the central disc.

These soil shelves are of great importance in controlling the placement of material, and the micro-environment within the soil. Seeds, fertiliser, pesticides and/or biological innoculants may also be deposited on the shelves using the winged side blades discussed above. Seed is normally deposited on one of the shelves, possibly accompanied by an innoculant and/or pesticide. Fertiliser is normally deposited on the other shelf so that the fertiliser and the seed do not come into contact with one another. Contact between seed and fertiliser is to be avoided as this may affect the viability of the seed or seedlings because of the concentration of salts within the fertiliser.

However, the action of the wings in creating the soil shelves results in lateral braking forces being applied by the soil against the blades and hence by the blades against the disc. In some circumstances the frictional braking forces of the blades upon the disc may become excessive when the soil is of a plastic nature. Such soils sometimes exert large lateral forces upon the blades as the latter deforms the soil sideways. Some of these soils also have little inherent shear strength and offer relatively poor traction to the disc—with the result that the disc may slip or stop turning altogether. This adversely affects the ability of the whole device to handle surface residues without blockage and/or to deposit seed and fertiliser in the soil in a regular pattern.

The wings of such blades also operate in the soil with a slight incline downward towards their fronts. This is to provide clearance at a blades rear-end for seed and/or fertiliser to be deposited on the soil shelves formed and also help to pull the blade into the soil. When blades are operating close to the soil surface this draw-in effect becomes variable because of the natural heterogeneity of the soil surface and the reduced volume of soil above the wings. At greater operating depths, variations in the soil surface are reduced because of the greater volume of soil sliding over the wings.

The variability of draw-in forces at shallow operating depths makes the setting of accurate depths difficult, which adversely affects germination of the seeds being sown and the emergence of their seedlings.

The function of the side blades is usually to deposit seed on one side of the disc and dry (usually granular) fertilisers on the other side of the disc.

A further problem with the above designs occurs when, in some applications it is desirable to apply the fertiliser as a liquid or to apply a liquid innoculant or liquid pesticides. In each of these situations it is preferable to apply the liquid material on one (or both) of the soil shelves formed in a position which does not wet the central disc and/or prevents the liquid from coming into contact with seed on another shelf. Further, it is desirable to avoid wetting the inside of a side blade so that, if desirable, dry particulate material can also be deposited by the same blade at the same time as liquid material.

A further problem with the above designs is caused by the pivotal linkage of a blade to a stationary mounting component. At the top of the blade, the front terminal horizontal surface of the blade locates close to the underneath horizontal surface of a stationary mounting component into which the blade is pivotally mounted. Immediately behind this area may be located a hollow seed or fertiliser delivery channel which transports seed, fertiliser and other dry material down through the blade to the soil.

Because the blade is required to pivot sideways so that it can remain in intimate contact with the disc as it flexes from side to side, a certain amount of clearance is necessary between the front terminal horizontal surface of the blade and the underneath horizontal surface of the stationary mounting component in which the blade is pivotally mounted.

This clearance sometimes allows straw and other material to enter the seed or fertiliser channel located immediately behind it in the blade, which can, over time, cause the seed or fertiliser channel to become blocked.

In existing devices disc wears through use and its diameter is progressively reduced. Usually blades wear at a faster rate than discs and are therefore replaced periodically before the discs are replaced. In most circumstances it is also preferred to use a disc with intermittent notches cut from its periphery because of the improved traction offered by such discs compared with plain discs.

As the worn-diameter of a notched disc is progressively reduced and new blades are attached, the new blades may operate until they come close to, or even overlap the notched areas of a reduced-diameter disc. When this occurs, the portion of the blades which overlap the notched portions of the disc are in contact with the disc for less time than the portions of the blades which remain in continual contact with the un-notched portions of the discs.

This results in uneven wear on the inside surfaces of the blades through continuous contact with the disc. This creates "high-spots" on the less-worn portions of the blades which in turn raise the rest of the blades fractionally off the disc surface and allow straw or other plant residues to jam between the blades and the disc, causing blockage and lifting the blade off the disc.

In some circumstances it is also desirable to place the fertiliser or other material in the soil deeper than the seed.

In some circumstances when the soil is hard and dry, penetration of the disc is difficult because of the cemented nature of the soil.

A side blade design that overcame the above disadvantages, and especially one that allowed the disc to be angled substantially parallel to its direction of travel, and that allowed (optionally) two side blades to be attached to the disc without risk of bloke by residue, would be a considerable advantage over previous side blade designs. Further, a side blade design which allowed a new blade to be seated easily into a disc with substantially intimate contact, which allowed seed and fertiliser to be placed at different soil depths, which did not excessively brake a disc, and which allow for the variations in wear in the disc diameter over time would of great advantage over prior art.

It is an object of the present invention to address the foregoing problems or at least to provide the public with a useful choice.

Further aspects and advantages of the present invention will become apparent from the ensuing description that is given by way of example only.

DISCLOSURE OF INVENTION

According to one aspect of the present invention there is provided a seed sowing apparatus, said apparatus including a substantially flat circular disc mounted on a frame so as to be rotatable about a horizontal axis while partly embedded in soil and drawn in a forward direction substantially parallel to the soil surface and substantially perpendicular to a disc axle, and at least one blade having a leading edge defined by the intersection of two opposite side faces, and means for mounting said blade on said apparatus so that said leading edge is held close to or in intimate contact with said disc, wherein said leading edge is inclined in a plane of said blade such that an angle of the leading edge with respect to an arc of the disc surface passing beneath the leading edge is zero or positive over the entire length of the leading edge.

According to another aspect of the present invention there is provided a method of manufacturing a seed sowing apparatus which prevents matter accumulating between a rotating disc incorporated into the seed sowing apparatus and the side blade disposed close to or in intimate contact with the surface of said disc, said method including the steps of:

i) forming a leading edge in said blade such that the angle between the leading edge inclined in a plane of said blade and an arc of said seed sowing apparatus disc passing beneath the leading edge is positive or zero over the entire length of said leading edge, and ii) mounting said blade relative to said disc.

According to another aspect of the present invention there is provided a blade for a seed sowing apparatus said seed sowing apparatus including a rotatable disc, said blade including a leading edge defined by the intersection of two opposite side faces, wherein said leading edge is inclined in a plane of said blade such that when mounted on said seed sowing apparatus, an angle of the leading edge with respect to an arc of the disc surface passing beneath the leading edge is zero or positive over the entire length of the leading edge.

By ensuring that a positive angle is maintained between the leading edge and the arc described by portions of the disc surface as they pass beneath the leading edge, soil, roots and plant residues adhering to the disc surface are deflected by the leading edge of the blade towards the outer periphery of the blade, over the whole length of the blade leading edge. Hence there is no tendency for material to accumulate on the inside of the blade leading edge, with the subsequent problem of causing the blade to separate from the disc, detracting from its intended function. Consequently the window required in the conventional designs is no longer necessary, simplifying the design and reducing material requirements so that manufacturing and material cost may be considerably reduced. Although a small gap is still required at the top of the blade between the blade and the disc, ingress of straw in this region will be continuously swept by the blade surface away from the inside of the leading edge since there is no region where the blade surface approaches the rear of the leading edge. Although material adhering to the disc may not be scraped completely from the disc in the upper region of the blade due to the necessary gap provided between the leading edge of the blade and the disc surface to avoid possible mechanical jamming, since the outer surface of the blade at the leading edge is inclined in a sectional plane of the blade away from the leading edge, there is no tendency for soil remaining on the blade to be forced between the blade and the disc, and hence restriction to rotation of the disc or contact of the blade with the disc is not effected by the presence of material on the disc in this region.

The inclined leading edge may be curved or include a series of straight sections of leading edge, the only requirement being that the leading edge is maintained at a positive or zero angle with respect to the arc of the disc surface passing beneath the leading edge at any point along the leading edge.

In one embodiment, the leading edge may be maintained generally straight over the lower region that is designed to operate beneath the ground, and then curved gradually towards the top of the blade In view of severe abrasive conditions to which the blade is subjected, the blade should preferably be cast from wear resistant steel or other abrasion-resistant material. Since the design allows for a reduction in metal requirements, compared to conventional blades, a saving in cost of relatively expensive wear resistant steel material also be achieved. Other materials, for example, ceramics, tungsten carbide, or similar materials or a combination of materials may also be used in constructing the blade.

According to a further aspect of the present invention the leading edge portion of the blade which is designed to lie close to or in contact with the surface of the disc, may be formed as a continuous face with a rear edge thereof formed, as with the leading edge to make a zero or positive angle with respect to an arc of the surface passing beneath the rear edge.

By having the rear edge and the leading edge of the leading edge portion of the blade both inclined at a positive or zero angle with respect to the arc of the disc's surface passing therebeneath, there is no tendency for material entering behind the leading edge portion to be carried by the disc towards the rear of the leading edge and causing blockage and subsequent separation of the leading edge from the disc. Although it is generally envisaged that to minimise wear of the disc and contact friction, the leading edge portion should be formed as a relatively narrow strip, the function of the device is not limited to this, and any suitable width is possible provided the angle of the rear edge is zero or positive with respect to the arc of the disc surface passing therebeneath.

In all preferred embodiments of the present invention, it should be appreciated that either one or two side blades may be attached to the disk. In addition, if two side blades are used, these may not necessarily have the same length. For example, it may be desirable to plant seed and fertiliser in the soil at locations spaced or displaced both horizontally and vertically from each other. In this case, side blades of different lengths attached to the disc allow the operator of the seed sowing apparatus to perform this task reasonably quickly and easily.

In a preferred embodiment a blade may include a bedding in improving component. Such components may be adapted to allow a new blade to be bedded into or fitted to an existing disc and to intimately contact the existing disc quickly and easily.

In a preferred embodiment the leading edge of each blade may be shaped to include a bedding in component shaped as a narrow raised edge on the inner surface adapted to be the first surface to contact the disc when a new blade is installed in the seed sowing apparatus. This narrow raised edge may be designed to wear away quickly with use against the disc and in so doing establish intimate contact between the two components. Once established, this integrity of intimate contact will normally persist for the lifetime of the blade.

According to another aspect of the present invention there is provided a seed sowing apparatus substantially as described above, said apparatus including two blades of an equal length.

In a preferred embodiment blades of unequal lengths may be used in conjunction with the present invention. Numerous different sizes and lengths of blade may be used with a seed sowing apparatus, giving a number of different advantages as discussed below. Preferably different length blades used have a length difference of at least 5-mm but no more than 150 mm.

In a preferred embodiment the seed sowing apparatus blades may be formed from a number of different lengths, extending down to different heights along the side of a disc. For example, in such an embodiment, short, medium and long length blades may be manufactured and used in the seed sowing apparatus. The use of different lengths of left hand and right hand blades that may be interchanged provide many advantages over prior art devices.

By employing two short blades of equal length on either side of the disc the braking effect, (brought about by friction between both side blades and the disc), can be reduced because the resultant braking forces act closer towards the centre of rotation of the disc.

Since the disc is caused to rotate by its periphery being tractormotively pulled through the ground (i.e. the forces causing rotation are applied tangentially to the disc by the ground), braking forces acting on the disc are of less consequence if their resultant point of action is moved towards the centre of rotation of the disc rather than towards the periphery of the disc. This is partly because the centre of the disc is moving slower than its edges, and hence any breaking force will have less effect on the speed of the disc. It is also partly because a greater moment arm exists between the application of rotational force and braking resistance as the latter is moved closer to the disc axle.

Further, because the upper portion of the blades remain at a fixed position relative to the centre of the disc, in order to achieve target seeding depth with shorter variants of the blades, the disc needs to penetrate further into the ground than when using blades of greater length, thus providing improved disc-soil contact and traction. The net effect is to decrease the likelihood of the disc slipping or stalling altogether in such adverse soil conditions.

By choosing blades of dissimilar length, seed and fertiliser can be deposited at different heights. By incorporating blades of different lengths on opposite sides of the disc, the seed and fertiliser can be separated diagonally as the operator chooses according to the conditions of the soil and materials being used. Diagonal separation of seed and fertiliser is sometimes necessary where soil conditions are dry, or where the amount or toxicity of the fertiliser is known to be harmful to susceptible seeds or seedlings. By choosing a shorter blade on the seed side than the fertiliser side the separation distance and geometry between the two products sown can be easily altered.

In hard soils, which are difficult to penetrate, the use of longer-than-normal blades reduces the amount of penetration required from the disc before the blades reach their intended seeding depth. In this case frictional braking forces applied by the side blades to the disc are moved down from the disc centre, but do not cause major difficulties because soil strength is usually high in dry soils and the side forces from the soil to the blades are low. This is because hard dry soils tend to shatter aside as the disc moves forwards (i.e. they are not of a plastic nature).

Further, by employing progressively shorter and shorter blades as the disc is reduced in diameter (because of normal soil wear) the blades can be maintained in their correct positions relative to notches on a disc. This maintains consistency of wear on the interfaces between the discs and the inside of the blades, and extends the useful life of the discs.

A short blade also allows an operator to choose a smaller diameter new disc from the outset for hard soils.

Where a shallow seeding depth is required, by arranging the blade length selection so that the seeding blade is operating shallow but the fertiliser blade is operating more deeply, some of the variations in draw-in forces for the disc provided by the shallow blade can be reduced because the longer blade has an increased volume of soil passing over it.

With all of the problems which are answered by alternative lengths of blades, the upper and lower limits of blade length are dictated by operational and design constraints of the seed sowing apparatus. The blades may not be so long as to protrude below the notches of notched discs, even when the latter are worn.

Similarly there is a lower limit to the shortness of blades, brought about by the need to have a minimum clearance between the ground surface and the attachment-zone of the blades (especially when operating in the presence of considerable surface residues). If this distance is too small, blockages will occur in the field as residues accumulate on the stationary components of the opener to which the top of the side blades attaches.

In a preferred embodiment the relative length of each blade may be compared by measuring the distance that the blade protrudes down from the centre of the disc to the start of any scalloping or cut away notches in the bottom edge of the blade. In a preferred embodiment short, medium and long length blades may be used in conjunction with the present invention.

In such an embodiment a medium length blade may extend down approximately between 78%–84% of the radius of the disc (being the distance between the disc axle and lower-most point of a blade). A short blade may extend from between 70%–78% of the disc radius, and the long blade may extend from between 84%–91% of the disc radius.

In a preferred embodiment the blade design may facilitate the application of liquid or gaseous material (for example fertiliser, innoculant or pesticide) into the soil. Such a design may allow fluid to be deposited on at least one soil shelf in a position which does not wet the central disc and/or the insides of the blades, nor come into contact with the seed when the latter is deposited on the opposite soil shelf. In the case of gaseous material rapid condensation usually results in the material becoming liquid as it is deposited on a soil shelf.

In a preferred embodiment of the present invention the seed sowing apparatus may include a material delivery system that allows liquid or gas to be deposited to at least one soil shelf formed by the said seed sowing apparatus.

In a further preferred embodiment such a material delivery system may be adapted to prevent material it delivers from contacting the disc and/or any blades incorporated into the seed sowing apparatus.

In a further preferred embodiment transport of liquid or gaseous material to the soil shelf area beneath the soil may be achieved using a material delivery tube. Such tubing may be embedded within the material from which the blades are manufactured, or may be attached to the blade at a later time. To facilitate the latter attachment option, at least one of the side blades may have a groove shaped into it along the inside or rear of the rear-most edge (which is otherwise held clear of the disc) so it forms the outer wall of the seed or fertiliser delivery channel.

In one embodiment, where the liquid delivery tube is affixed to a groove in the blade by welding or using suitable cement or glue, the lower end of the tube may bend horizontally outwards away from the disc. For this purpose the tube may be located in a groove shaped into the rear or inner edge of the horizontal wing of the side blade so it is protected from soil movement. This ensures that liquid or gas is directed away from the central disc as it exits the cylindrical tube under pressure.

However in alternative embodiments the liquid or gas delivery tube used may not be bent outwards as discussed above. For example in an alternative embodiment the liquid or gas delivery tube may be bent or orientated rearwardly and reference to the above only throughout this specification should in no way be seen as limiting.

In a further preferred embodiment the liquid or gas delivery tube may have a small diameter, be cylindrical in shape and be constructed from a rigid material.

In a preferred embodiment the seed sowing apparatus may include at least one blocking element adapted to restrict the passage of contaminants such as straw, vegetative materials and other debris between sad at least one blade and the disc.

In a further preferred embodiment the blocking element may be formed as a projection in the means for mounting said at least one blade on the said sowing apparatus where each blade mounted in the said sowing apparatus also includes a recess adapted to fit the blade over or onto the projection of the blocking element.

In a further preferred embodiment the top horizontal surface of a blade may have a small recess designed into it. In such an embodiment the underneath side of the stationary mounting component in which the blade fits may also include a protrusion which can project downwards to fill the recess in the blade. This protrusion in the device's mounting component may project towards the blade in such a way that straw and other material will not able to pass freely through or between the two components into the seed or fertiliser delivery channel.

Because the blade is preferably slipped into its pivotal connection to in the stationary mounting component from the rear edge of the blade, and the recess discussed above is preferable in the front portion of the blade, the overlap provided by the recess and protrusion is only effective when a blade is pushed fully into its mount. Minimal clearance between these components is desirable to prevent ingress of straw and other debris and to allow for casting inaccuracies.

It is an object of the present invention to address the foregoing problems or at least to provide the public with a useful choice.

Further aspects and advantages of the present invention will become apparent from the ensuing description that is given by way of example only.

BRIEF DESCRIPTION OF DRAWINGS

Further aspects of the present invention will become apparent from the ensuing description that is given by way of example only and with reference to the accompanying drawings in which.

BEST MODES FOR CARRYING OUT THE INVENTION

Aspects of the present invention have been described by way of example only and it should be appreciated that modifications and additions may be made thereto without departing from the scope thereof as defined in the appended claims.

Figure 1:
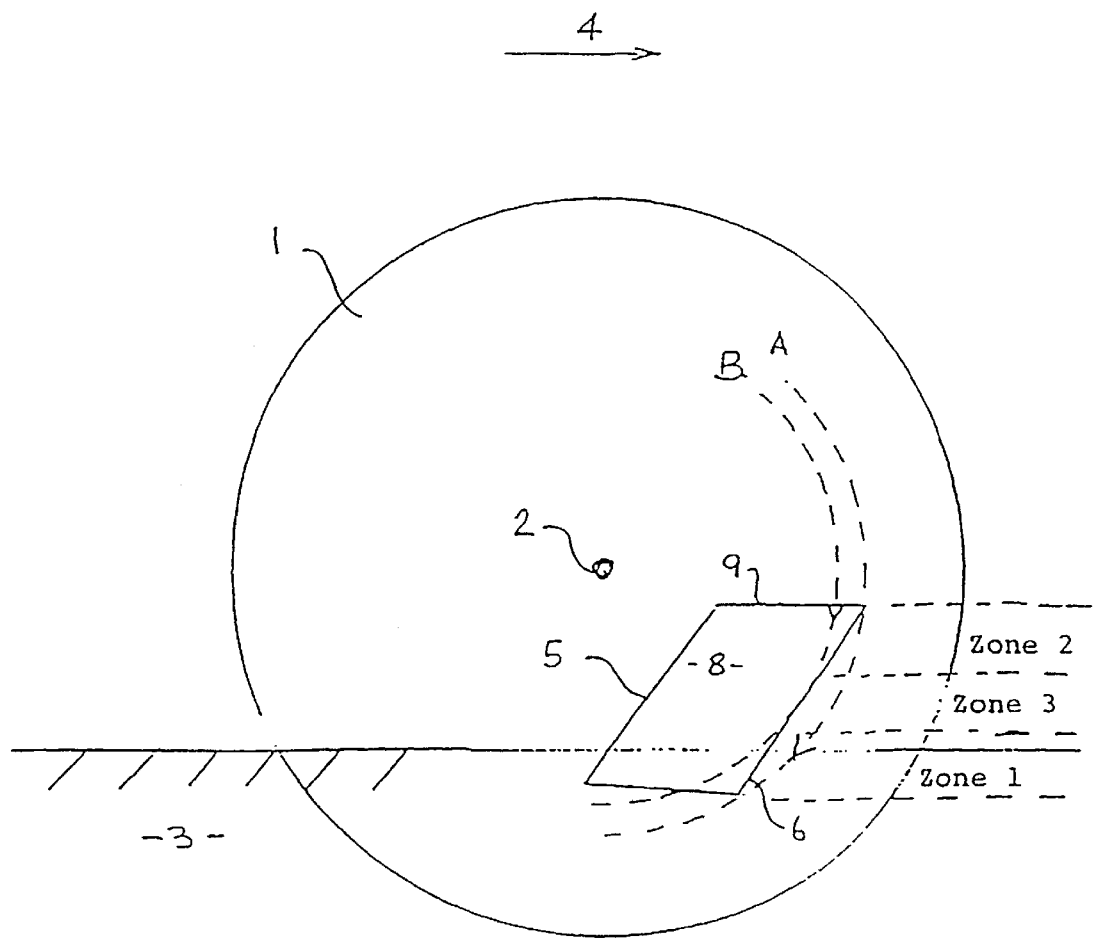
FIG. 1: is a schematic diagram showing the arrangement of a conventional blade of a rotating disc type seed sowing apparatus.

A conventional seed sowing apparatus to which the present invention is addressed is shown schematically in FIG. 1. The seed sowing apparatus comprises a flat circular disc 1 mounted on a frame so as to be rotatable about a horizontal axle 2 while partly embedded in soil 3 and drawn in a forward direction generally indicated by arrow 4 substantially parallel to the surface of the soil 3 and perpendicular to the axle 2. A blade 5 of the seed sowing apparatus includes a leading edge 6 defined by the intersection of an inner face or side surface 7 (not visible in the figure) facing the surface of the disc 1 and an outer face or side surface 8. The outer face 8 is formed as a substantially curved surface in section view such that the surface in the region of the leading edge 6 is inclined in a plane normal to the blade 5 away from the leading edge, to deflect material away from the disc. The blade 5 is pivotally mounted at a top portion 9 to a frame member of the seed sowing apparatus (not shown in the figure) so as to allow the blade 5 to deflect a limited amount laterally (perpendicular to the disc 1) so that most (and at least the lower portion) of leading edge 6 can maintain faithful contact with the surface of the disc 1 as the latter flexes naturally in response to the heterogeneity of the soil and the changing direction of travel. Other means of attaching the blades 5 to the disc 1, such as incorporating a means to allow the blade to pivot substantially vertically and/or horizontally with respect to the disc 1, may be used in other embodiments of either the prior art or in preferred embodiments of the present invention.

As shown in FIG. 1, the leading edge 6 of the blade 5 is straight and is inclined forward at an angle to the surface of the ground 3. The blade 5 is supported on the frame of the seed sowing apparatus and positioned relative to the disc 1 so that a lower portion of the blade 5 is below the surface of the ground 3. This portion serves to spread the ground away from the surface of the disc 1 so that seed, fertiliser and the like may drop from a chute (not shown in the figure) arranged to feed into this region, and thus be sown into the ground.

Due to the blade 5 having a straight leading edge 6, the angle of the leading edge 6 with respect to an arc described by a portion of the disc surface as it passes beneath the leading edge varies along the leading edge 6. This is illustrated in the figure by two different arcs of travel of surface portions of the disc indicated by dotted lines A, B. Arc A is inclined outwards at a positive angle with respect to the leading edge at the bottom portion of the blade 5 and is inclined inwards at a negative angle with respect to the leading edge at the top portion, while arc B passes tangential to the central portion of the leading edge 6 at a zero angle.

The region of positive angle is denoted in FIG. 1 as zone 1, the region of negative angle is denoted as zone 2, while the region of approximately zero angle is denoted as zone 3. As discussed before, with this configuration, material adhering to the disc 1, is forced behind the leading edge 6 of the blade 5 in the zone 2 region of the leading edge 6 thereby tending to separate the leading edge 6 of the blade 5 from the surface of the disc 1, affecting the function of the blade 5.

Figure 2:
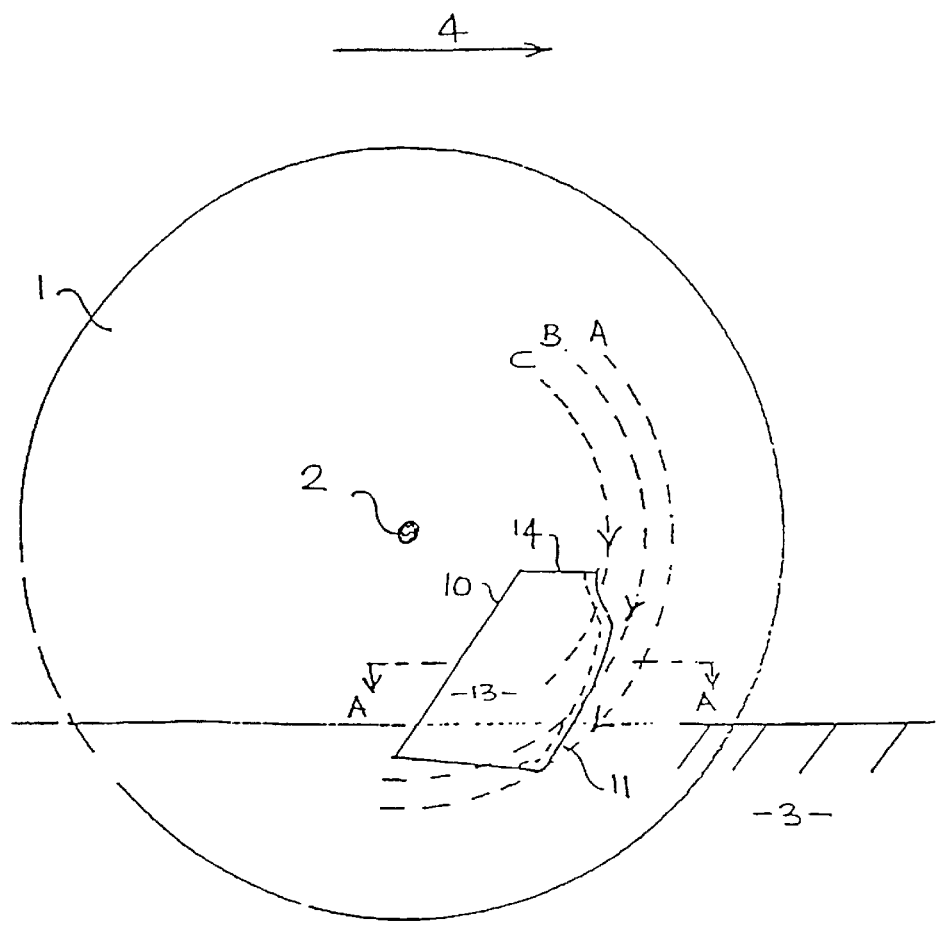
FIG. 2: is a schematic diagram showing a blade according to an embodiment of the present invention.

FIG. 2 shows a blade 10 for a seed sowing apparatus according to the present invention designed to overcome the above problems. The blade 10 is mounted on a seed sowing apparatus similar to the conventional arrangement of FIG. 1 and components having a similar function are identified by the same numerals. The blade 10 comprises a leading edge 11 defined by the intersection of an inner face 12 (not shown in FIG. 2 but shown in FIG. 3) and outer face or side surface 13 formed in a similar fashion to those of blade 5. The blade 10 is also similarly mounted at a top portion 14 to a frame member of the seed sowing apparatus (not shown in the figure).

As shown in FIG. 2, the leading edge 11 of the blade 10 is inclined in a plane of the blade throughout its length so that an angle between the leading edge 11 and arcs A and B of the surface of the disc 2 is maintained positive over the full length of the leading edge 11. The top portion 14 of the blade 10 is also made much narrower (measured parallel to the disc) than the top portion 9 of the conventional blade 5 so that material adhering to the disc 1 in the region of arc C is also deflected towards the outer periphery of the disc 1. This reduction in width also reduces the amount of material required in casting the blade 10 with reduction in costs.

Figure 3:
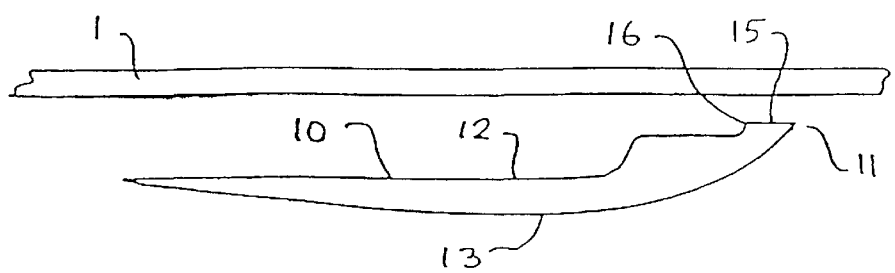
FIG. 3: is a sectional view on A—A of FIG. 2, and FIG. 4: shows a schematic diagram of a number of different length blades which may be orientated on one side of a conventional rotating disc in accordance with another embodiment of the present invention.

Details of the leading edge portion are shown more clearly in FIG. 3, which is a cross section on A—A in FIG. 2. As shown in FIG. 3, the leading edge portion of the blade 10 is formed as a narrow strip 15 defined between the leading edge 11 and a rear edge 16. The leading edge portion 15 is generally formed as a narrow strip along the full length of the leading edge 11 as shown in dotted outline in FIG. 2 so that the rear edge 16 also is inclined at a positive angle with respect to the arc of the disc surface. This further ensures that material does not enter behind the leading edge portion 15 and is not swept by the disc towards the rear edge portion 16, and instead moves away from the rear edge 16 so that clogging does not occur. This strip may wear away, or broaden overtime, and thus may not be a permanent feature of the present invention. The rear portion of the blade 10 is formed similar to the conventional blade to allow seed and fertiliser to drop into the slot formed in the ground by the disc 1.

Figure 4:
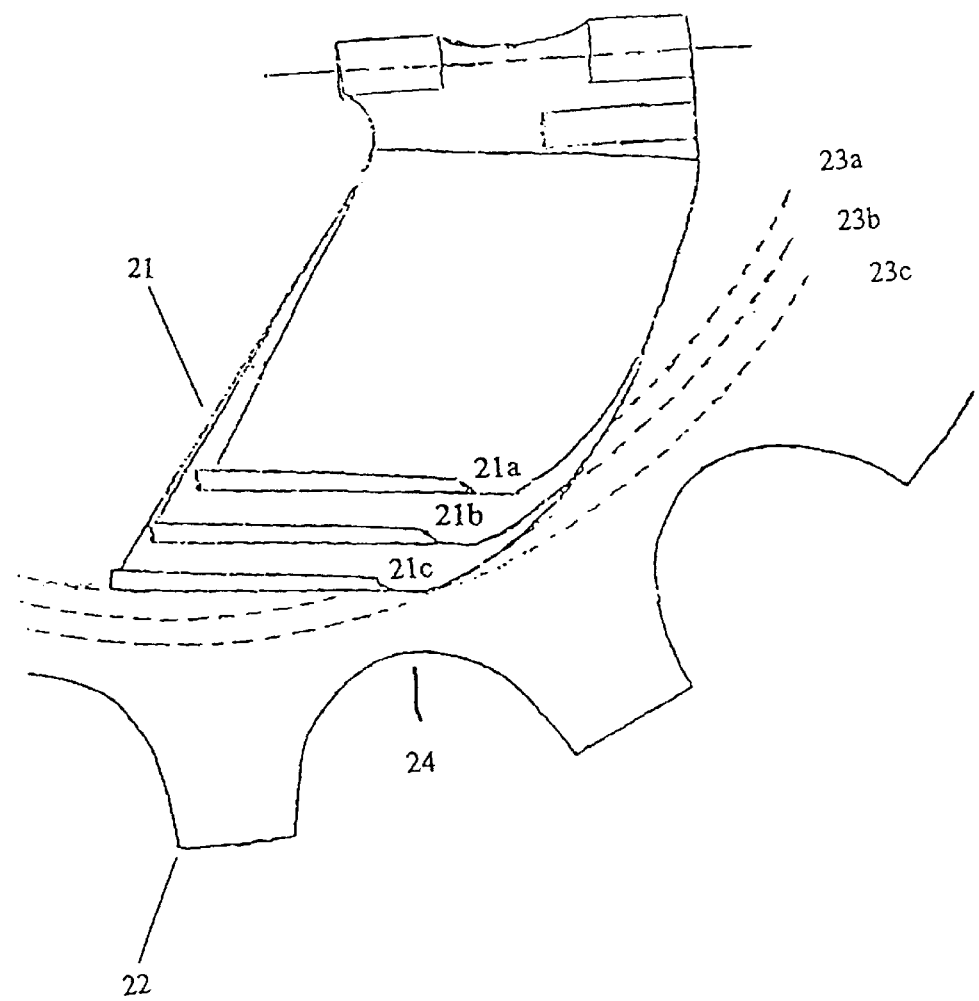

FIG. 4 shows a number of different length blades 21 next to a disc 22. As those skilled in the art will appreciate, normally a single blade only is fixed to one side of the disc and three blades are shown in FIG. 4 to compare each of the other blade lengths used. In use, a short blade 21a may be mounted next to the disc 22 to reduce the braking force applied to the disc during use. Short blade 21a can also be used to ensure that the blade contact with the disc is inside the disc scallops or notches when used with a worn disc. A medium length blade 21b as used in the present invention gives a "standard" disc protrusion below the shelf created by the blades wing. The long blade 21c can be used in hard soils to limit the depth to which the disc 22 has to penetrate to ensure that the blade 21 forms a ledge in the soil.

As can be appreciated by those skilled in the art the particular length of blade selected can be determined by the type and condition of the soil in which it is to be used.

Different length blades may also be used on the opposite side of the disc 22 to separate seeds and fertiliser or other materials that are deposited at the same time from each other. The combination of the long and the short blade on either side of the disc allows on seeding to be completed at shallow depths.

Figure 5:
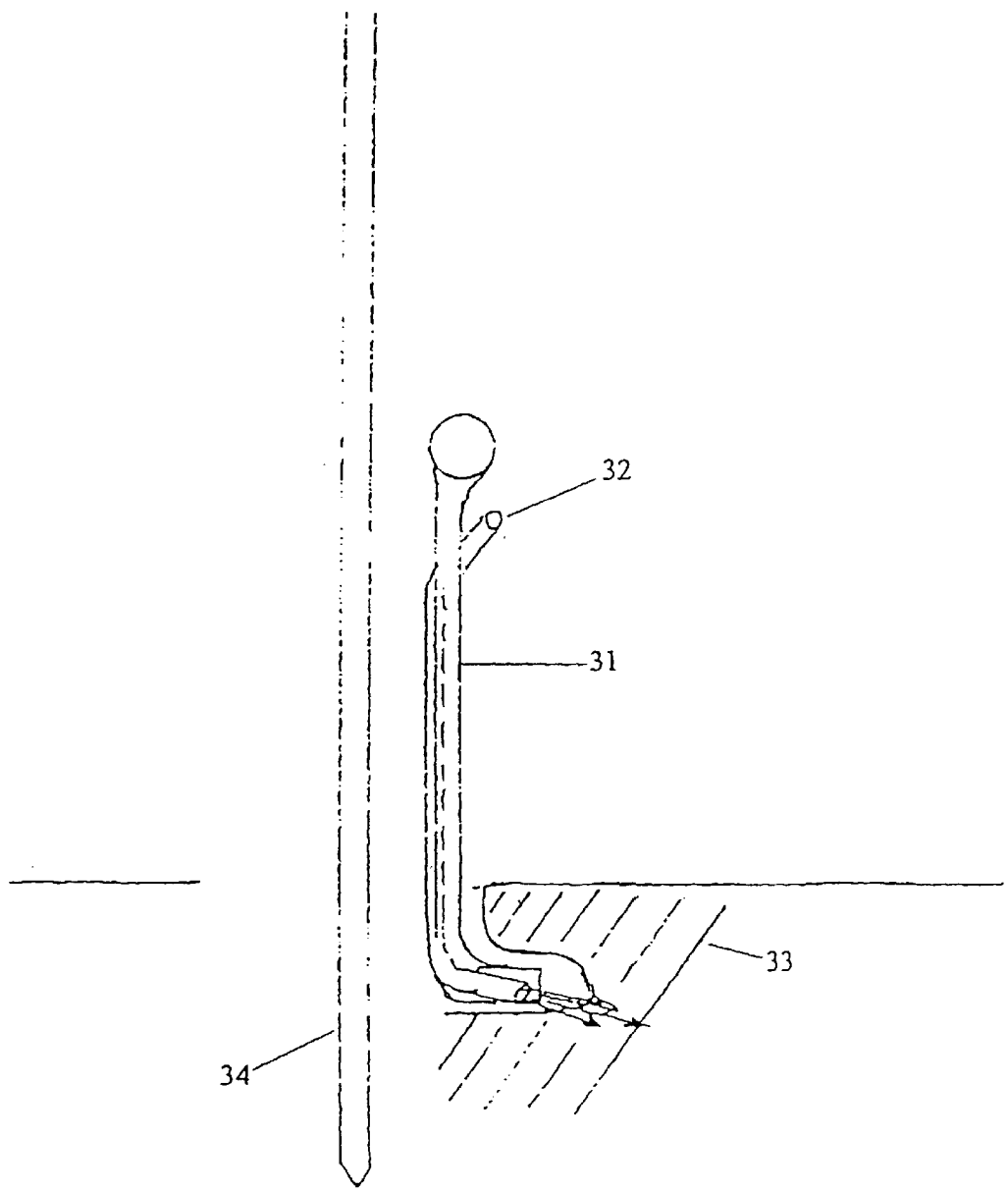
FIG. 5: shows a fluid delivery tube attached to a blade in accordance with another aspect of the present invention.

FIG. 5 shows a blade 31 configured in accordance with another aspect of the present invention to receive a fluid delivery tube 32. The blade 31 may include apertures at its top and bottom to allow the tube 32 to be slotted into or attached onto the blade.

The tube 32 may be used to deliver fluid into the soil 33 without the fluid delivered coming into contact with either the blade 31 or the seed sowing apparatus' disc 34.

Figure 6:
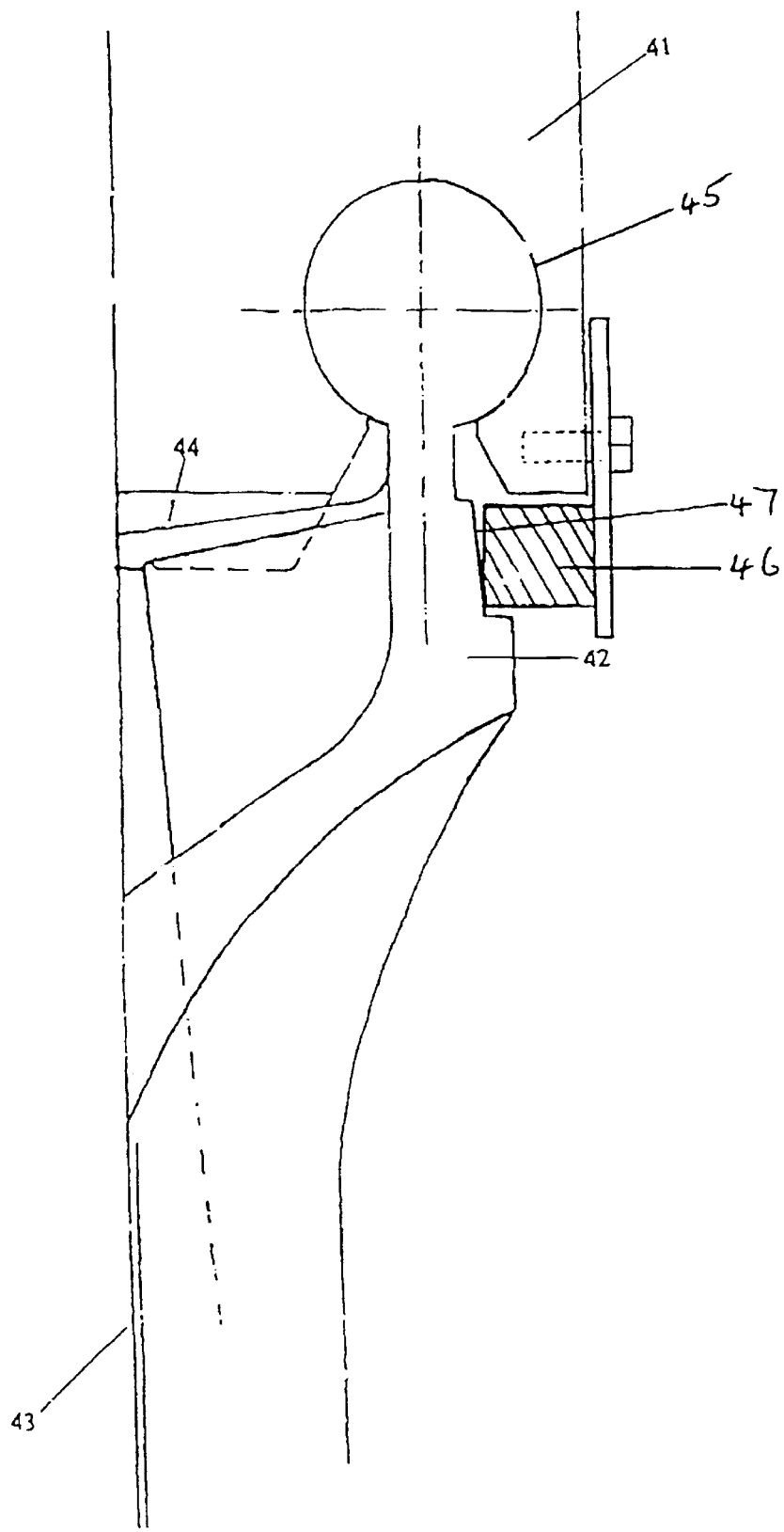
FIG. 6: shows a blade and stationary mounting component configured in accordance with a further aspect of the present invention.

FIG. 6 shows an end view of one section of seed sowing apparatus configured in accordance with another aspect of the present invention.

The apparatus shown includes a stationary mounting component 41 to which a blade 42 is pivotally mounted in a tube 45 formed within the stationary mounting component 41. The blade 42 is configured so as to come into contact with a rotating disc 43.

The mounting component 41 also includes a protrusion 44 that extends down towards the top of the blade 42. As the blade 42 pivots outwards during use of the apparatus, the protrusion 44 prevents straw, grass or other foreign materials passing into the gap formed between the disc 43 and the top shoulder of the blade 42 as the blade pivots outwards. The protrusion 44 blocks any foreign matter that may enter through this gap and become lodged on the blade, forcing same permanently away from the disc 43.

FIG. 6 also shows a rubber pressure paid 46 pressing against a ramp 47 on the blade 42. Force from the rubber pressure pad 46 ensures the blade is pre-loaded against the disc 43 so as to prevent straw or soil from lodging between the blade and the disc.

Figure 7A:
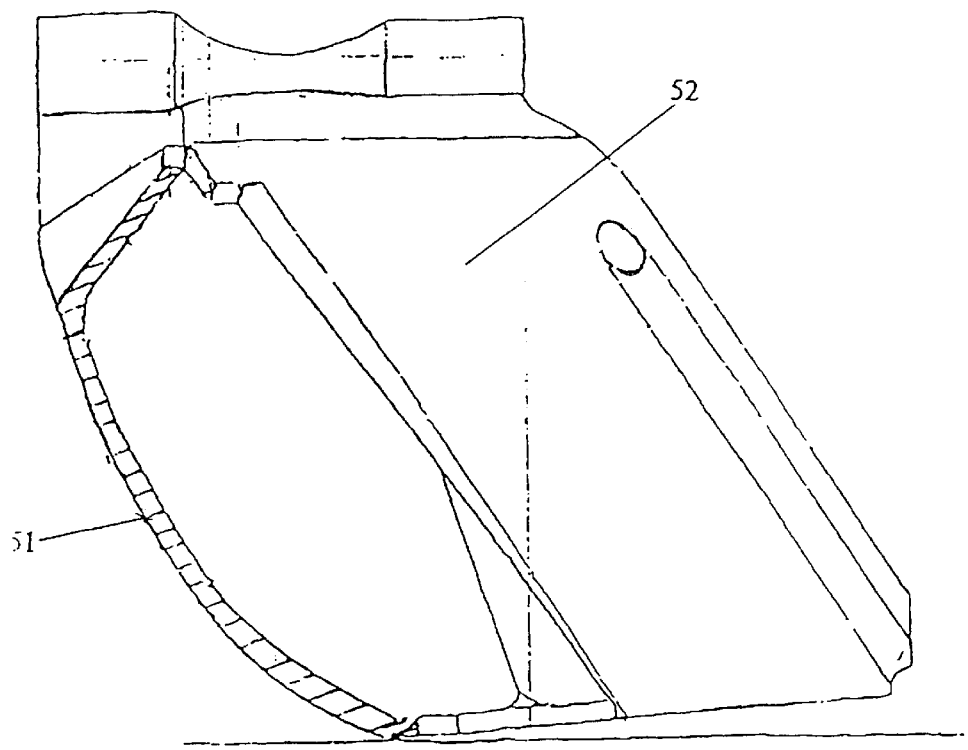
FIG. 7 shows a side view 7a and top view 7b of a blade configured in accordance with another aspect of the present invention to include a bedding in front edge.
Figure 7B:
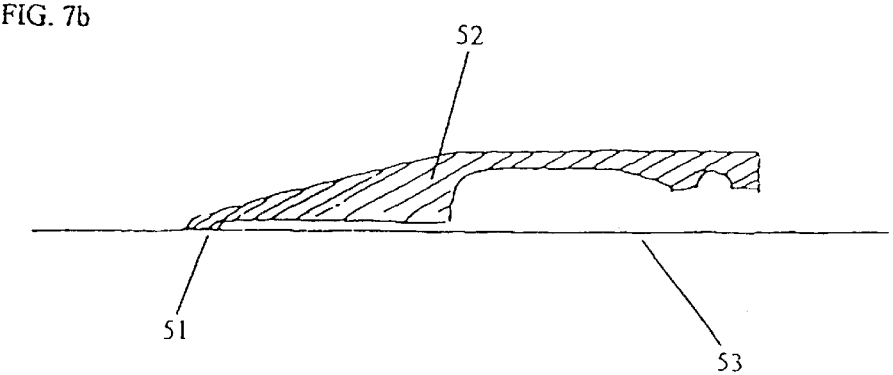

FIG. 7 shows a side and top view of the inside surface of a blade that includes a bedding in edge in accordance with another aspect of the present invention. As can be seen from FIGS. 7a and 7b the front leading edge 51 of the blade 52 is built up with respect to the remainder of the blades surface which is adapted to engage with the seed sowing apparatus disc 53.

In use when a new blade 52 is connected into the seed sowing apparatus the bedding in edge 51 of the blade 52 wears down quickly with contact to the disc 53, providing a complementary and intimate contact between the two surfaces. Once this intimate contact is established the remaining inner surface of the blade 52 wears slowly over time while remaining in intimate contact with the disc 53.

I believe the advantages of my invention to be as follows however it should be appreciated that all such advantages may not be realised on all embodiments of the invention, and the following list is given by way of example only as being indicative of potential advantages of the present invention. Furthermore, it is not intended that the advantages of the present invention be restricted to those of the list that follows:

1. By ensuring a positive angle is maintained between the leading edge and the arc described by portions of the disc surface as they pass beneath the leading edge, soil, roots and plant residues adhering to the disc surface are deflected by the leading edge of the blade towards the outer periphery of the disc over the whole length of the blade leading edge, overcoming any tendency for material to accumulate on the inside of the blade leading edge.
2. By eliminating the accumulation of soil within the blade, the need for an exit window in the blade is similarly eliminated, simplifying the design and reducing material requirements so that manufacturing and material costs may be considerably reduced.
3. Because the top of the blade is narrower (measured parallel to the disc) the quantity of expensive wear resistant alloy needed to cast the blade is reduced significantly since this is in the region where the blade is thickest.
4. Since both the leading edge and the rear edge of the leading edge portion are both inclined at a positive or zero angle with respect to the arc of the disc surface passing therebeneath, there is no tendency for material adhering to the disc to be forced between the disc and the leading edge portion. Furthermore, since the outer surface of the blade at the leading edge is inclined, this serves to deflect material away from the disc surface so there is no tendency for material remaining on the disc to be forced between the blade and the disc. Hence material on the disc in this region does not tend to restrict rotation of the disc, or cause separation of the blade from the disc.
5. The upper portion of the leading edge of the blade can now be constructed with more tolerance between it and the disc making manufacture cheaper. Soil accumulates on the upper surface and effectively seals the gap from the ingress of residues or other materials.
6. The raised "bedding in" edge of a new blade allows the blade to form an intimate contact with a disc quickly as the bedding edge wears down. This edge quickly provides a complementary fit between the blade edge and the rotating disc.
7. The use of different lengths of blades configured to be interchangeable with each other allows short blades to be used to reduce the breaking force placed on a disc, different lengths of blade to separate seeds and fertiliser or other materials from each other, long blades to be used in hard soil to reduce the depth to which the disc has to protrude, a long blade and a short blade to be used for seeding in shallow depths and three different lengths of blade to be used as the main disc wears down with use over time.
8. The fluid delivery tube may also be used to deliver fluid materials into the soil at the same time as seeds.
9. The block or protrusion on the stationary attachment component for a blade also prevents straw and other matter from being lodged between the blade and its attachment to a disc.

Aspects of the present invention have been described by way of example only and it should be appreciated that modifications and additions may be made thereto without departing from the scope thereof as defined in the appended claims.

What we claim is:

1. A seed sowing apparatus comprising:
    a substantially flat, circular disc having a disc surface, mounted on a frame so as to be rotatable about a horizontal axis while partly embedded in soil and drawn in a forward direction substantially parallel to a surface of the soil and substantially perpendicular to an axle through the disc; and
    a blade having a leading edge defined by an intersection of two opposite side surfaces; and
    means for mounting the blade on the seed sowing apparatus so that the leading edge is held substantially adjacent to the disc, wherein the leading edge of the blade is inclined in a plane of the blade such that an angle of the leading edge with respect to an arc of the disc surface passing beneath the leading edge is greater than or equal to zero over an entire length of the leading edge.

2. The seed sowing apparatus according to claim 1, wherein the leading edge of the blade is maintained straight over a lower region of the blade to operate beneath the surface of the soil, and is curved towards an upper region of the blade.

3. The seed sowing apparatus according to claim 1, wherein the leading edge of the blade includes a continuous face with a rear edge thereof, the rear edge being made to form an angle greater than or equal to zero, with respect to an arc of the disc surface passing beneath the rear edge of the blade.

4. The seed sowing apparatus according to claim 1, wherein the blade is composed of wear-resistant steel material.

5. The seed sowing apparatus according to claim 1, further comprising:

a blocking element for restricting passage of contaminants between the disc and the blade.

6. The seed sowing apparatus according to claim 5, wherein the blocking element is formed as a projection on the means for mounting the blade on the seed sowing apparatus; and wherein the blade includes a recess for enabling the blade to fit over or onto the projection formed by the blocking element.

7. The seed sowing apparatus according to claim 6, wherein the blade recess is formed on a horizontal surface of an upper region of the blade.

8. The seed sowing apparatus according to claim 7, wherein the blade recess is located in a front portion of the blade.

9. The seed sowing apparatus according to claim 1, further comprising:

two side blades of different lengths for depositing material at locations both horizontally and vertically displaced from one another in the soil during use of the apparatus, due to the different lengths of the side blades.

10. The seed sowing apparatus according to claim 9, wherein the difference in length between the blades is in a range from about 5 millimeters to about 150 millimeters.

11. The seed sowing apparatus according to claim 9, wherein one of the two side blades includes a medium length blade which extends from about 78% to about 84% of a radius of the disc, as measured from a center of the disc to a lowest edge of the disc.

12. The seed sowing apparatus according to claim 9, wherein one of the two side blades includes a short length blade which extends from about 70% to about 78% of a radius of the disc, as measured from a center of the disc to a lowest edge of the disc.

13. The seed sowing apparatus according to claim 9, wherein one of the two side blades includes a long length blade which extends from about 84% to about 91% of a radius of the disc, as measured from a center of the disc to a lowest edge of the disc.

14. The seed sowing apparatus according to claim 9, wherein the two side blades include a short length blade and a long length blade, whereby seed is delivered into the soil from a side of the disc adjacent to the short blade, and the long blade provides a homogeneous drawing-in force to the disc.

15. The seed sowing apparatus according to claim 1, further comprising a material delivery system for delivering a liquid or gas material to be deposited in a soil shelf formed by the seed sowing apparatus, whereby the material delivery system prevents the liquid or gas material from contacting at least one of the disc and the blade.

16. The seed sowing apparatus according to claim 15, wherein the material delivery system is a web that is embedded within and formed from the blade.

17. The seed sowing apparatus according to claim 15, wherein the material delivery system is a tube, which is attached to the blade within a groove formed in an inside face and a rear edge of the blade.

18. The seed sowing apparatus according to claim 17, wherein the tube is oriented horizontally outwardly and rearwardly of one of the disc and the blade to prevent the liquid or gas material from contacting the disc and the blade.

19. The seed sowing apparatus according to claim 1, wherein the blade includes a bedding-in component for allowing the blade to be installed in a position substantially adjacent to the disc.

20. The seed sowing apparatus according to claim 19, wherein the bedding-in component includes a narrow raised edge on an inner surface of the blade that is a first surface to contact the disc when the blade is installed on the seed sowing apparatus.

21. The seed sowing apparatus according to claim 20, wherein the narrow raised edge wears away against the disc when in use; and wherein the disc is positioned substantially adjacent to the blade during installation of the blade.

22. A blade for use with a seed sowing apparatus that includes a rotatable disc having a disc surface;

wherein the blade includes a leading edge defined by an intersection of two opposite side faces, wherein the leading edge is inclined in a plane of the blade such that when the blade is mounted on the seed sowing apparatus, an angle formed by the leading edge of the blade and an arc of the disc surface rotated beneath the leading edge is greater than or equal to zero over an entire length of the leading edge.

23. A method of manufacturing a seed sowing apparatus that prevents matter from accumulating between a rotating disc incorporated into the seed sowing apparatus and a side blade disposed substantially adjacent to a surface of the disc, the method comprising the steps of:

forming a leading edge on the side blade, such that an angle between the leading edge and an arc of a surface of the disc, when passing beneath the leading edge, is greater than or equal to zero over an entire length of the leading edge; and mounting the blade relative to the disc.

* * * * *